UNITED STATES PATENT OFFICE.

FRIEDRICH WILHELM ELLERMANN, OF VIENNA, AUSTRIA-HUNGARY, ASSIGNOR TO MORICZ ENGL AND FLORIS WÜSTE, OF SAME PLACE.

ACCUMULATOR OR SECONDARY BATTERY.

SPECIFICATION forming part of Letters Patent No. 572,198, dated December 1, 1896.

Application filed December 16, 1895. Serial No. 572,349. (No model.) Patented in France August 24, 1894, No. 240,952; in Belgium August 24, 1894, No. 111,531; in England August 24, 1894, No. 16,162; in Hungary May 30, 1895, No. 2,852; in Austria July 23, 1895, No. 2,645, and in Germany August 24, 1895, No. 83,154.

*To all whom it may concern:*

Be it known that I, FRIEDRICH WILHELM ELLERMANN, a subject of the Emperor of Austria-Hungary, residing in the city of Vienna, in the Province of Lower Austria, in the Empire of Austria-Hungary, have invented certain new and useful Improvements in Accumulators or Secondary Batteries, of which the following is a specification.

This invention relates to accumulators or secondary batteries, also called "storage batteries;" and it consists in improvements in the plates used in such batteries, as will be described farther down, and for which I have obtained Letters Patent in the following countries: Germany, additional patent dated August 24, 1895, No. 83,154; France, dated August 24, 1894, No. 240,952; Belgium, dated August 24, 1894, No. 111,531; Great Britain, dated August 24, 1894, No. 16,162; Austria, dated July 23, 1895, No. 2,645, and Hungary, May 30, 1895, No. 2,852.

The existing constructions of accumulators may be divided into two classes or groups. The one group comprises those accumulators which are based upon the Faure construction. These accumulators are provided with lead plates which are covered with pure lead oxids mixed with diluted sulfuric acid. A peculiar grating construction facilitates the holding on of the mass, which is easily crumbling and falling off. The other group comprises those accumulators which contain as little lead as possible, but certain additions to the lead oxids which produce a chemical or mechanical effect, thus making it possible to produce very solid plates of peroxid requiring no mechanical protection, but only an abductor of proper construction. This peculiar composition has for its object on the one hand to increase the capacity of and on the other hand to insure a longer duration to the plate. In order to increase the capacity, it is necessary to use as much as possible of the active mass and to afford the latter the possibility of absorbing or binding large quantities of hydrogen gas on the negative plate, and to effect rapidly the chemical process of reduction and oxidation on the positive plate it is necessary to make the plates as porous as possible, especially the positive ones, as the electrochemical process is effected by the action of the sulfuric acid, which must penetrate the interior of the active mass. As each loosening of the mass effects a diminution of the capacity, the mass must be formed so that it maintains always the same volume during the operations of charging and discharging the battery. The duration of the plate depends upon this latter circumstance. The external parts of the plate are first reduced, whereby these portions are expanded or stretched, when a displacing and breaking loose of the lead hyperoxid takes place.

It is the object of this invention to avoid the described deficiencies and to produce plates which have a great capacity by virtue of the purity of the chemical composition employed and due to their porosity. My novel plates have besides a great duration, as they cannot expand while being discharged. The compositions employed take up water like cement and thus obtain a great degree of firmness and hardness.

The action of the chemically-combined water is a double one: First, the mass becomes harder and more compact, and it maintains or keeps its hardness also after the formation of the plates; secondly, the chemically-combined water disappears from the plate during the process of forming the plates, so that the hyperoxid has room to expand and besides leaves room or space between the molecules, so that the sulfuric acid may freely circulate.

I obtain the said composition by mixing litharge and sulfate of magnesium or other suitable sulfates of the light metals with liquid ammonia, so that the components form a plastic mass. The plates are formed directly out of this mass. The finished plates are then kept for two or three days in a neutral, acid, or alkaline liquor, preferably in a slight acid solution, when the composition becomes sufficiently hard to render the plates fit for electrode-plates. The plates thus hardened are not to be formed in sulfuric acid, but in solutions of salt, preferably in a solution of sulfate of magnesium. In the formed state they nevertheless resist all solutions of sulfuric acid.

Having thus described my invention, what I claim therein as new, and desire to secure by Letters Patent, is—

1. A composition for manufacturing accumulator-plates consisting of litharge and sulfate of magnesium mixed into a plastic mass with liquid ammonia, substantially as described.

2. The process of manufacturing accumulator-plates consisting in first preparing a plastic mass of litharge and sulfate of magnesium with liquid ammonia, then forming the plates out of this mass, then keeping the plates for several days in a hardening liquor whereby the plates acquire a cement-like hardness, substantially as and for the purposes described.

3. The process of manufacturing accumulator-plates consisting in forming the plates out of a mass of litharge, sulfate of magnesium and liquid ammonia, then treating the plates in a hardening liquor and then effecting the formation of the same in a solution of sulfate of magnesium, substantially as described.

In testimony whereof I have signed this specification in presence of two subscribing witnesses.

FRIEDRICH WILHELM ELLERMANN.

Witnesses:
ALBERT LORENZ,
DEAN B. MASON.